US009960412B2

(12) United States Patent
Lee et al.

(10) Patent No.: US 9,960,412 B2
(45) Date of Patent: May 1, 2018

(54) ELECTRODE ACTIVE MATERIAL WITH LOW MOISTURE RETENTION AND LITHIUM SECONDARY BATTERY INCLUDING THE SAME

(71) Applicant: LG Chem, Ltd., Seoul (KR)

(72) Inventors: Min Hee Lee, Gyeonggi-do (KR); Seong Min Lee, Seoul (KR); Tae Jin Park, Daejeon (KR)

(73) Assignee: LG Chem, Ltd. (KR)

(*) Notice: Subject to any disclaimer, the term of this patent is extended or adjusted under 35 U.S.C. 154(b) by 251 days.

(21) Appl. No.: 14/463,718

(22) Filed: Aug. 20, 2014

(65) Prior Publication Data
US 2014/0356696 A1    Dec. 4, 2014

Related U.S. Application Data

(63) Continuation of application No. PCT/KR2013/003212, filed on Apr. 17, 2013.

(30) Foreign Application Priority Data

Apr. 17, 2012    (KR) .................. 10-2012-0039469

(51) Int. Cl.
*H01M 2/00*    (2006.01)
*H01M 4/36*    (2006.01)
(Continued)

(52) U.S. Cl.
CPC .......... *H01M 4/364* (2013.01); *H01M 4/131* (2013.01); *H01M 4/483* (2013.01); *H01M 4/485* (2013.01);
(Continued)

(58) Field of Classification Search
CPC ...... H01M 4/364; H01M 4/131; H01M 4/483; H01M 4/485; H01M 4/505; H01M 4/525; H01M 10/052
See application file for complete search history.

(56) References Cited

U.S. PATENT DOCUMENTS

2003/0091900 A1    5/2003 Numata et al.
2006/0204845 A1    9/2006 Chang et al.
(Continued)

FOREIGN PATENT DOCUMENTS

CN    1822414 A    8/2006
CN    101128949 A    2/2008
(Continued)

OTHER PUBLICATIONS

International Search Report for PCT/KR2013/003212 dated Jul. 18, 2013.

*Primary Examiner* — Jimmy Vo
(74) *Attorney, Agent, or Firm* — Lerner, David, Littenberg, Krumholz & Mentlik, LLP

(57) ABSTRACT

The present invention is directed to a lithium secondary battery comprising an anode comprising an anode active material, a cathode comprising a cathode active material, and a polymer membrane, wherein the polymer membrane is disposed between the cathode and the anode, wherein the anode active material comprises a mixture of at least two kinds of lithium metal oxide particles having different mass median particle diameters D50, wherein the lithium metal oxide particles are secondary particles comprising primary particles, the mixture comprises first lithium metal oxide particles having a mass median particle diameter D50 of 1 nm to less than 3 μm, second lithium metal oxide particles having a mass median particle diameter D50 of 3 μm to 30
(Continued)

µm, and a mix ratio of the first lithium metal oxide particles to the second lithium metal oxide particles is 70:30 to 30:70.

5 Claims, 2 Drawing Sheets

(51) Int. Cl.
    *H01M 4/485*     (2010.01)
    *H01M 4/131*     (2010.01)
    *H01M 4/48*     (2010.01)
    *H01M 4/505*     (2010.01)
    *H01M 4/525*     (2010.01)
    *H01M 10/052*     (2010.01)

(52) U.S. Cl.
    CPC ........... *H01M 4/505* (2013.01); *H01M 4/525* (2013.01); *H01M 10/052* (2013.01); *Y10T 428/2982* (2015.01)

(56) References Cited

U.S. PATENT DOCUMENTS

| | | |
|---|---|---|
| 2006/0257745 A1 | 11/2006 | Choi et al. |
| 2007/0048597 A1 | 3/2007 | Ryu et al. |
| 2007/0231705 A1 | 10/2007 | Ohzuku et al. |
| 2007/0281214 A1 | 12/2007 | Saruwatari et al. |
| 2008/0031798 A1 | 2/2008 | Bourbon et al. |
| 2008/0226987 A1* | 9/2008 | Yumoto ............... C01G 23/005 429/231.5 |
| 2010/0015523 A1 | 1/2010 | Ryu et al. |
| 2012/0270093 A1 | 10/2012 | Isozaki et al. |
| 2013/0108929 A1 | 5/2013 | Ito et al. |
| 2013/0260251 A1 | 10/2013 | Shiroki et al. |

FOREIGN PATENT DOCUMENTS

| | | |
|---|---|---|
| EP | 2811551 A1 | 12/2014 |
| JP | 2003-137547 A | 5/2003 |
| JP | 2005-228706 A | 8/2005 |
| JP | 2007-273405 A | 10/2007 |
| JP | 2008511528 A | 4/2008 |
| JP | 2008-293875 A | 12/2008 |
| JP | 2009-076402 A | 4/2009 |
| JP | 2011-181528 A | 9/2011 |
| JP | 2012009401 A | 1/2012 |
| JP | 2012-059528 A | 3/2012 |
| JP | 2013-091584 A | 5/2013 |
| JP | 2013-206869 A | 10/2013 |
| KR | 20010052015 A | 6/2001 |
| KR | 20060091486 A | 8/2006 |
| KR | 20060094050 A | 8/2006 |
| KR | 100783293 B1 | 12/2007 |
| KR | 20080017111 A | 2/2008 |
| KR | 20080112809 A | 12/2008 |
| WO | 2011/108106 A1 | 9/2011 |

* cited by examiner

ELECTRODE ACTIVE MATERIAL WITH LOW MOISTURE RETENTION AND LITHIUM SECONDARY BATTERY INCLUDING THE SAME

CROSS-REFERENCE TO RELATED APPLICATIONS

The present application is a continuation of International Application No. PCT/KR2013/003212 filed on Apr. 17, 2013, which claims the benefit of Korean Patent Application No. 10-2012-0039469, filed Apr. 17, 2012, the disclosures of which are incorporated herein by reference.

TECHNICAL FIELD

The present invention relates to a rechargeable secondary battery and an electrode active material constituting the secondary battery.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques, such as nuclear energy, solar energy, wind energy, tidal power, and the like, continues to be underway, and power storage devices for more efficient use of the generated energy are also drawing much attention.

In particular, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and the market for lithium secondary batteries continues to expand to applications such as auxiliary power suppliers through smart-grid technology.

Lithium titanium oxides have an initial charge and discharge cycle efficiency of approximately 100% and have a high operating voltage and thus film formation on a surface of an anode due to electrolyte decomposition reaction does not occur. Accordingly, these lithium titanium oxides are expected to be used as a high-output anode material.

DISCLOSURE

Technical Problem

A lithium titanium oxide has a property of absorbing moisture in air.

Meanwhile, the lithium titanium oxide has a slow lithium ion diffusion rate and thus, to shorten a movement distance of lithium ions, synthesized lithium titanium oxide particles need to have a nanometer scale.

However, nanoparticles require a large amount of solvent in an electrode fabrication process and thus productivity is reduced. In addition, nanoparticles are susceptible to moisture and thus battery characteristics are deteriorated.

Absorbed moisture decomposes and thus a large amount of gas is generated. This is a cause of deterioration of battery performance.

The present invention provides an electrode active material with minimized moisture absorption and a lithium secondary battery including the same.

Technical Solution

In accordance with one aspect of the present invention, provided is an electrode active material including a mixture of at least two kinds of lithium metal oxide particles having different mass median particle diameters D50. The lithium metal oxide particles may be secondary particles consisting of primary particles.

The mixture may include first lithium metal oxide particles having a mass median particle diameter D50 of 1 nm to less than 3 μm and second lithium metal oxide particles having a mass median particle diameter D50 of 3 μm to 30 μm.

In particular, the mass median particle diameter D50 of the first lithium metal oxide particles may be in the range of 100 nm to less than 2.5 μm, for example, in the range of 500 nm to less than 2.0 μm, for example, in the range of 700 nm to less than 1.8 μm.

The mass median particle diameter D50 of the second lithium metal oxide particles may be in the range of 5 μm to less than 25 μm, for example, in the range of 10 μm to less than 20 μm, for example, in the range of 12 μm to less than 20 μm.

A mix ratio of the first lithium metal oxide particles to the second lithium metal oxide particles may be 70:30 to 30:70.

Referring to FIG. 1, embodiments of the present invention exhibit a non-linear reduction in moisture content within the mix ratio range described above. This demonstrates that reduction in moisture content is significant within the above-described mix ratio range.

That is, when at least two kinds of lithium metal oxide particles having different mass median particle diameters D50 are simply mixed, moisture content is expected to be linearly reduced according to a mix ratio thereof, but, unlike such expectation, the results obtained according to embodiments of the present invention show that moisture content is non-linearly reduced.

The present invention also provides a lithium secondary battery including an electrode including the electrode active material described above and a polymer membrane and having a structure in which an electrode assembly including the polymer membrane disposed between a cathode and an anode is accommodated in a battery case and sealed. The lithium secondary battery may include a lithium salt-containing non-aqueous electrolyte.

The lithium secondary battery may be a lithium ion battery, a lithium ion polymer battery, or a lithium polymer battery.

The electrode may be a cathode or an anode and may be manufactured using a manufacturing method including the following processes.

The manufacturing method includes:

preparing a binder solution by dispersing or dissolving a binder in a solvent;

preparing an electrode slurry by mixing the binder solution, an electrode active material, and a conductive material;

coating the electrode slurry on a current collector;

drying the electrode;

and pressing the electrode to a certain thickness.

In some cases, the manufacturing method may further include drying the pressed electrode.

Preparation of the binder solution is a process of preparing a binder solution by dispersing or dissolving a binder in a solvent.

The binder may be all binders known in the art and, in particular, be one selected from the group consisting of fluorine resin-based binders such as polyvinylidene fluoride (PVdF) and polytetrafluoroethylene (PTFE), rubber-based binders such as styrene-butadiene rubber, acrylonitrile-butadiene rubber, and styrene-isoprene rubber, cellulose-based binders such as carboxymethylcellulose (CMC), starch, hydroxypropylcellulose, and regenerated cellulose, polyalcohol-based binders, polyolefin-based binders such as polyethylene and polypropylene, polyimide-based binders, polyester-based binders, mussel adhesives, and silane-based binders or a mixture or copolymer of at least two thereof The solvent may be selectively used according to kind of a binder and, for example, be an organic solvent such as isopropyl alcohol, N-methylpyrrolidone (NMP), acetone, or the like, water, or the like.

The electrode slurry may be prepared by mixing/dispersing an electrode active material and a conductive material in the binder solution. The prepared electrode slurry may be transferred using a storage tank and stored prior to coating. The electrode slurry may be continuously stirred in the storage tank to prevent the electrode slurry from hardening.

Examples of the electrode active material include, but are not limited to, layered compounds such as lithium cobalt oxide ($LiCoO_2$) and lithium nickel oxide ($LiNiO_2$), or compounds substituted with one or more transition metals; lithium manganese oxides having the formula $Li_{1+y}Mn_{2-y}O_4$ where $0 \leq y \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-y}M_yO_2$ where M=Co, Mn, Al, Cu, Fe, Mg, B, or Ga, and $0.01 \leq y \leq 0.3$; lithium manganese composite oxides of Formula $LiMn_{2-y}M_yO_2$ where M=Co, Ni, Fe, Cr, Zn, or Ta, and $0.01 \leq y \leq 0.1$), or Formula $Li_2Mn_3MO_8$ where M=Fe, Co, Ni, Cu, or Zn; $LiMn_2O_4$ in which some of the Li atoms are substituted with alkaline earth metal ions; disulfide compounds; $Fe_2(MoO_4)_3$; carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

In a non-limiting embodiment of the present invention, the electrode active material may include a lithium metal oxide, and the lithium metal oxide may be represented by Formula 1 below:

$$Li_aM'_bO_{4-c}A_c \quad (1)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ in which a and b are determined according to oxidation number of M';

$0 \leq c < 0.2$ in which c is determined according to oxidation number of A; and A is at least one monovalent or divalent anion.

The oxide of Formula 1 may be represented by Formula 2 below:

$$Li_aTi_bO_4 \quad (2)$$

wherein $0.5 \leq a \leq 3$ and $1 \leq b \leq 2.5$.

The lithium metal oxide may be $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like, but embodiments of the present invention are not limited thereto.

In a non-limiting embodiment of the present invention, the lithium metal oxide may be $Li_{1.33}Ti_{1.67}O_4$ or $LiTi_2O_4$. $Li_{1.33}Ti_{1.67}O_4$ has a spinel structure with small change in crystal structure during charge and discharge and excellent reversibility.

The lithium metal oxide may be prepared using a preparation method known in the art, for example, a solid-phase method, a hydrothermal method, a sol-gel method, or the like. A detailed description of the preparation method will be omitted herein.

The conductive material is not particularly limited so long as it does not cause chemical changes in the fabricated battery and has conductivity. Examples of the conductive material include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

As desired, the electrode slurry may further selectively include a filler, or the like.

The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry is a process of coating the electrode slurry onto a current collector in a predetermined pattern and to a certain thickness by passing through a coater head.

The coating of the electrode slurry may be performed by distributing the electrode slurry on a current collector and uniformly dispersing the electrode slurry thereon using a doctor blade or the like, or by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated battery and has high conductivity. For example, the current collector may be made of copper, stainless steel, aluminum, nickel, titanium, sintered carbon, copper or stainless steel surface-treated with carbon, nickel, titanium, silver, or the like, an aluminum-cadmium alloy, or the like. A cathode current collector may have fine irregularities at a surface thereof to increase adhesion between a cathode active material and the cathode current collector and may be used in any of various forms including films, sheets, foils, nets, porous structures, foams, and non-woven fabrics. In particular, the cathode current collector may be a current collector containing a metal such as aluminum, and an anode current collector may be a current collector containing a metal such as copper. The electrode current collector may be a metal foil, for example, Al foil or Cu foil.

The drying of the electrode is a process of removing a solvent and moisture in the slurry to dry the slurry coated on the current collector. In a specific embodiment, the drying is performed in a vacuum oven at 50 to 200° C. for a period of one day.

The manufacturing method may further include a cooling process after the drying, and the cooling process may be performed by slowly cooling to room temperature so that a recrystalline structure of the binder is satisfactorily formed.

To increase capacity density of the electrode on which the coating process has been completed and to enhance adhesion between the current collector and the electrode active material, the electrode may be pressed to a desired thickness by passing through two rolls heated to high temperature. This process is referred to as a rolling process.

Before passing through the two rolls, the electrode may be pre-heated. The pre-heating process is a process of pre-heating the electrode before introduction into the two rolls to enhance electrode pressing effects.

The rolled electrode may be dried in a vacuum oven at 50 to 200° C., which is a temperature range that is a melting point or higher of a binder, for a period of one day. The rolled electrode may be cut to a certain size and then dried.

After the drying process, a cooling process may further be performed, and the cooling process may be performed by slowly cooling to room temperature so that a recrystalline structure of the binder is satisfactorily formed.

The polymer membrane is a separator which separates a cathode from an anode. When a solid electrolyte such as a polymer or the like is used, the solid electrolyte may also act as a separator.

As the separator, an insulating thin film having high ion permeability and mechanical strength is used. The separator typically has a pore diameter of 0.01 to 10 μm and a thickness of 5 to 300 μm.

As the separator, sheets or non-woven fabrics, made of an olefin-based polymer such as polypropylene; or glass fibers or polyethylene, which have chemical resistance and hydrophobicity, or Kraft paper is used. Examples of commercially available separators include Celgard series such as Celgare® 2400 and 2300 (available from Hoechest Celanese Corp.), polypropylene separators (available from Ube Industries Ltd., or Pall RAI Co.) and polyethylene series (available from Tonen or Entek).

In some cases, a gel polymer electrolyte may be coated on the separator to enhance battery stability. Examples of gel polymers include, but are not limited to, polyethylene oxide, polyvinylidene fluoride, and polyacrylonitrile.

Examples of the electrode assembly include electrode assemblies known in the art such as a jellyroll-type electrode assembly (or a winding-type electrode assembly), a stack-type electrode assembly, and a stack/folding type electrode assembly.

The term "stack/folding type electrode assembly" as used herein may be understood to include a stack/folding type electrode assembly manufactured by arranging, on a separator sheet, unit cells, each of which includes a cathode, an anode, and a separator disposed therebetween, and folding or winding the separator sheet.

In addition, the electrode assembly may include an electrode assembly in which a stacked structure including separators with any one of a cathode and an anode disposed therebetween is laminated by thermal fusion or the like.

As the non-aqueous electrolyte, a non-aqueous electrolytic solution, an organic solid electrolyte, an inorganic solid electrolyte, or the like is used.

For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$-LiI-LiOH, $LiSiO_4$, $LiSiO_4$-LiI-LiOH, $Li_2SiS_3$, $Li_4SiO_4$, $Li_4SiO_4$-LiI-LiOH, and $Li_3PO_4$-$Li_2S$-$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoroethylene carbonate (FEC), propene sultone (PRS), fluoro-propylene carbonate (FPC), or the like.

The lithium secondary battery according to the present invention may include the lithium metal oxide of Formula 1 as an anode active material and, as a cathode active material, a lithium metal oxide represented by Formula 3 below:

$$Li_xM_yMn_{2-y}O_{4-z}A_z \qquad (3)$$

wherein $0.9 \leq x \leq 1.2$, $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

A maximum substitution amount of A may be less than 0.3 mol %. In a specific embodiment of the present invention, A may be at least one anion selected from the group consisting of halogens such as F, Cl, Br, and I, S, and N.

Substitution of these anions enables high binding ability with transition metals and prevents structural transition of the compound, whereby the lithium secondary battery may have enhanced lifespan. On the other hand, when a substitution amount of the anion A is too large (t≥0.2), the lifespan of the lithium secondary battery may be deteriorated due to an incomplete crystal structure.

In particular, the oxide of Formula 3 may be a lithium metal oxide represented by Formula 4 below:

$$Li_xNi_yMn_{2-y}O_4 \qquad (4)$$

wherein $0.9 \leq x \leq 1.2$ and $0.4 \leq y \leq 0.5$.

More particularly, the lithium metal oxide may be $LiNi_{0.5}Mn_{1.5}O_4$ or $LiNi_{0.4}Mn_{1.6}O_4$.

The lithium secondary battery according to the present invention may be used in a battery cell used as a power source of small devices and may also be used as a unit battery of medium and large battery modules including a plurality of battery cells.

In addition, the present invention provides a battery pack including the battery module as a power source of medium and large devices. Examples of the medium and large devices include, but are not limited to, electric vehicles (EVs), hybrid electric vehicles (HEVs), plug-in hybrid electric vehicles (PHEVs), and devices for storing power.

Structures and fabrication methods of the battery module and the battery pack are known in the art and a detailed description thereof will thus be omitted herein.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings. These examples are provided for illustrative purposes only and should not be construed as limiting the scope and spirit of the present invention.

Example 1

A mixture of $Li_4Ti_5O_{12}$ (LTO #1) having a mass median particle diameter D50 of 1.5 μm and $Li_4Ti_5O_{12}$ (LTO #2) having a mass median particle diameter D50 of 15.6 μm in a weight ratio of 70:30 was prepared. The mass median particle diameter D50 was measured using a particle size distribution (PSD) measurement device.

Example 2

A mixture of $Li_4Ti_5O_{12}$ (LTO #1) having a mass median particle diameter D50 of 1.5 μm and $Li_4Ti_5O_{12}$ (LTO #2) having a mass median particle diameter D50 of 15.6 μm in a weight ratio of 50:50 was prepared. The mass median particle diameter D50 was measured using a PSD measurement device.

Example 3

A mixture of $Li_4Ti_5O_{12}$ (LTO #1) having a mass median particle diameter D50 of 1.5 μm and $Li_4Ti_5O_{12}$ (LTO #2) having a mass median particle diameter D50 of 15.6 μm in a weight ratio of 30:70 was prepared. The mass median particle diameter D50 was measured using a PSD measurement device.

Comparative Example 1

A mixture of $Li_4Ti_5O_{12}$ (LTO #1) having a mass median particle diameter D50 of 1.5 μm and $Li_4Ti_5O_{12}$ (LTO #2) having a mass median particle diameter D50 of 15.6 μm in a weight ratio of 100:0 was prepared. The mass median particle diameter D50 was measured using a PSD measurement device.

Comparative Example 2

A mixture of $Li_4Ti_5O_{12}$, (LTO #1) having a mass median particle diameter D50 of 1.5 μm and $Li_4Ti_5O_{12}$ (LTO #2) having a mass median particle diameter D50 of 15.6 μm in a weight ratio of 0:100 was prepared. The mass median particle diameter D50 was measured using a PSD measurement device.

Experimental Example 1

The mixtures prepared according to Examples 1 to 3 and Comparative Examples 1 and 2 were dried at 130° C. for 48 hours and moisture content of each mixture was measured using a moisture analyzer (WDS400, Satorius) (temperature conditions: 40 to 400° C., measurement time: 20 minutes).

Figure 1:
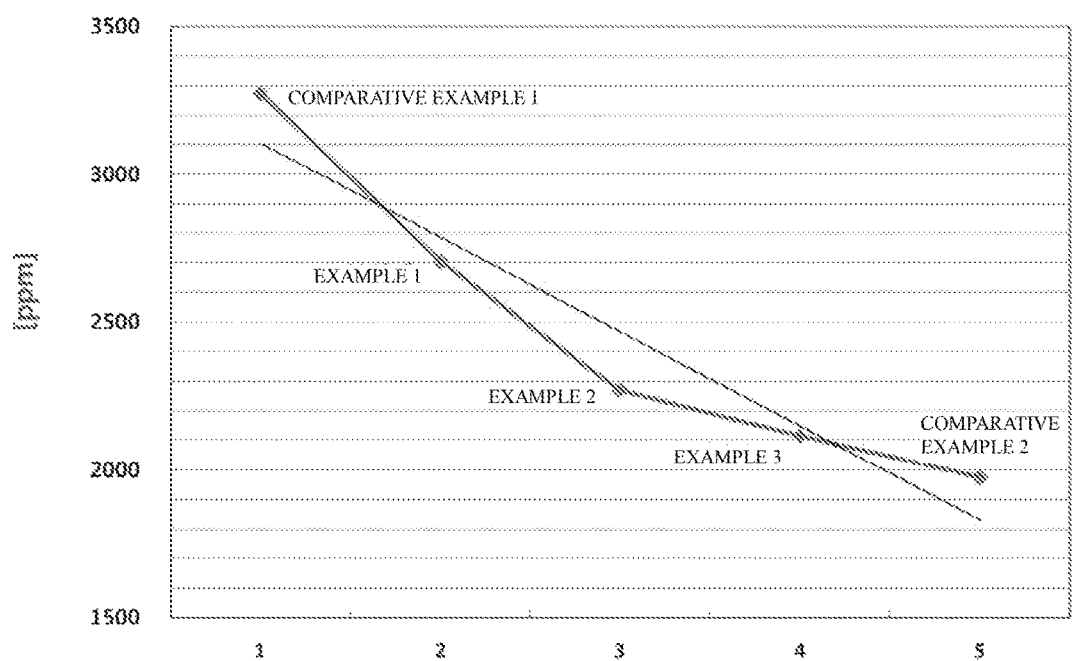
FIG. 1 is a graph showing measurement results of moisture contents of examples and comparative example.
Figure 2:
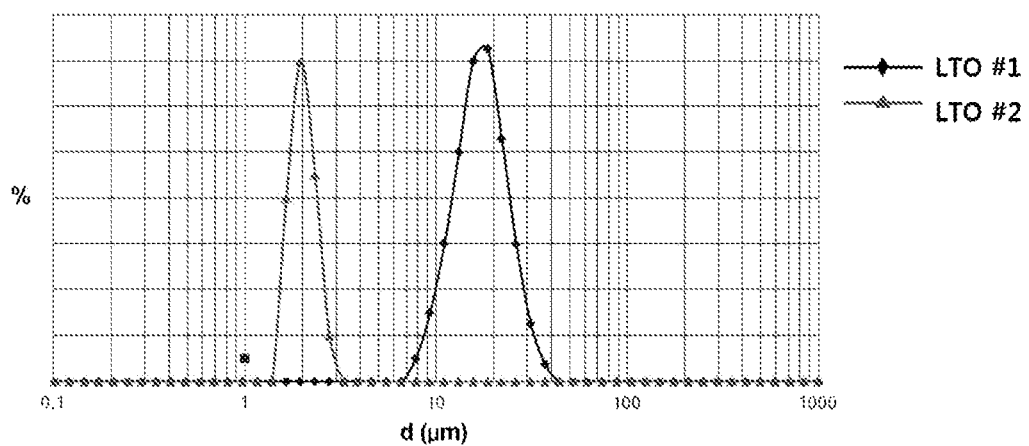
FIG. 2 is a graph showing measurement results of particle size distribution of lithium titanium oxides used in examples of the present invention.

Measurement results are shown in Table 1 below. Referring to FIG. 1, the mixtures of Examples 1 to 3 exhibit non-linear reduction in moisture content. These results are unlike what is expected that, when at least two kinds of lithium metal oxide particles having different mass median particle diameters D50 are simply mixed, moisture content of the mixture is linearly reduced according to a mix ratio thereof.

TABLE 1

| Mix ratio (LTO#1:LTO#2) | $1^{st}$ measurement result (ppm) | $2^{nd}$ measurement result (ppm) | Average (ppm) |
|---|---|---|---|
| 100:0 (Comparative Example 1) | 3140 | 3140 | 3275 |
| 70:30 (Example 1) | 2780 | 2630 | 2705 |
| 50:50 (Example 2) | 2330 | 2210 | 2270 |
| 30:70 (Example 3) | 2140 | 2090 | 2115 |
| 0:100 (Comparative Example 2) | 1890 | 2060 | 1975 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, unlike what is expected that the mixture exhibits a linear reduction in moisture content, the mixture exhibits a non-linear reduction in moisture content within the mix ratio described above. This is unlike what is expected that a simple mixture of at least two kinds of lithium metal oxide particles having different mass median particle diameters D50 exhibits a linear reduction in moisture content according to a mix ratio thereof and, in the present invention, critical effects are obtained within the above-described mix ratio. A lithium secondary battery including the electrode active material may exhibit enhanced performance due to minimization of side reaction due to moisture. In particular, generation of gas due to decomposition of moisture is reduced and thus enhanced safety may be achieved.

The invention claimed is:

1. A lithium secondary battery comprising:
an anode comprising an anode active material,
a cathode comprising a cathode active material, and
a polymer membrane, wherein the polymer membrane is disposed between the cathode and the anode,
wherein the anode active material comprises a mixture of at least two kinds of lithium metal oxide particles having different mass median particle diameters D50,
wherein the lithium metal oxide particles are—consist of secondary particles comprising primary particles,
the mixture comprises the first lithium metal oxide particles having a mass median particle diameter D50 of 700 nm to less than 1.8 μm and second lithium metal oxide particles having a mass median particle diameter D50 of 12 μm to less than 20 μm, and
a mix ratio of the first lithium metal oxide particles to the second lithium metal oxide particles is 70:30 to 30:70,
wherein the lithium metal oxide particles of the anode active material is composed of a lithium metal oxide represented by Formula 2 below:

$$Li_aTi_bO_4 \tag{2}$$

wherein $0.5 \leq a \leq 3$ and $1 \leq b \leq 2.5$, and
the cathode active material is composed of a lithium metal oxide represented by Formula 3 below:

$$Li_xM_yMn_{2-y}O_{4-z}A_z \tag{3}$$

wherein $0.9<x<1.2$, $0<y<2$, and $0<z<0.2$;
M is at least one element selected from the group consisting of Al, Mg, Ni, Co, Fe, Cr, V, Ti, Cu, B, Ca, Zn, Zr, Nb, Mo, Sr, Sb, W, Ti, and Bi; and
A is at least one monovalent or divalent anion.

2. The lithium secondary battery according to claim 1, wherein the lithium metal oxide represented by Formula 2 is $Li_{1.33}Ti_{1.67}O_4$ or $LiTi_2O_4$.

3. The lithium secondary battery according to claim 1, wherein the lithium secondary battery is a lithium ion battery.

4. The lithium secondary battery according to claim 1, wherein the lithium secondary battery is a lithium ion polymer battery.

5. The lithium secondary battery according to claim 1, wherein the lithium secondary battery is a lithium polymer battery.

* * * * *